US011940747B2

(12) United States Patent
Iwasaki

(10) Patent No.: US 11,940,747 B2
(45) Date of Patent: Mar. 26, 2024

(54) HEATER, FIXING APPARATUS, AND IMAGE FORMING APPARATUS

(71) Applicant: CANON KABUSHIKI KAISHA, Tokyo (JP)

(72) Inventor: Atsushi Iwasaki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/149,600

(22) Filed: Jan. 3, 2023

(65) Prior Publication Data

US 2023/0236531 A1 Jul. 27, 2023

(30) Foreign Application Priority Data

Jan. 27, 2022 (JP) ................................. 2022-010584

(51) Int. Cl.
*G03G 15/20* (2006.01)
*G03G 15/00* (2006.01)

(52) U.S. Cl.
CPC ..... *G03G 15/2039* (2013.01); *G03G 15/2064* (2013.01); *G03G 15/5004* (2013.01); *G03G 2215/2048* (2013.01)

(58) Field of Classification Search
USPC .......................................................... 399/328
See application file for complete search history.

(56) References Cited

U.S. PATENT DOCUMENTS

2021/0247710 A1* 8/2021 Sato ................... G03G 15/2042

FOREIGN PATENT DOCUMENTS

| | | | | | |
|---|---|---|---|---|---|
| JP | H06186870 A | | 7/1994 | |
| JP | H0764418 A | | 3/1995 | |
| JP | H08297431 A | | 11/1996 | |
| JP | 2001006846 A | | 1/2001 | |
| JP | 2017054071 A | * | 3/2017 | ......... G03G 15/2039 |
| JP | 2018194686 A | * | 12/2018 | ......... G03G 15/2003 |
| JP | 2018194686 A | | 12/2018 | |
| WO | WO-2018211968 A1 | * | 11/2018 | ............. G03G 15/20 |

* cited by examiner

*Primary Examiner* — Quana Grainger
(74) *Attorney, Agent, or Firm* — Canon U.S.A., Inc. I.P. Division

(57) ABSTRACT

In a longitudinal direction of a heater, a distance from a center portion of the heater to a first temperature detection element is a first distance, and a distance from the center portion of the heater to a second temperature detection element is a second distance greater than the first distance. In a first area which is farther from the center portion of the heater than the second temperature detection element is from the center portion of the heater in the longitudinal direction of the heater, a distance between a first conductor and a second conductor in a transverse direction of the heater is a first inter-conductor distance and a distance between a third conductor and a fourth conductor in the transverse direction is a second inter-conductor distance longer than the first inter-conductor distance.

16 Claims, 10 Drawing Sheets

PLAN VIEW OF HEATER 330 (THERMISTOR FORMING SURFACE) EXCLUDING PROTECTIVE MEMBER 332

PLAN VIEW OF HEATER 340 (THERMISTOR FORMING SURFACE) EXCLUDING SECOND PROTECTIVE MEMBER 342 AND THIRD PROTECTIVE MEMBER 343

PLAN VIEW OF HEATER 340 (THERMISTOR FORMING SURFACE) EXCLUDING THIRD PROTECTIVE MEMBER 343

HEATER, FIXING APPARATUS, AND IMAGE FORMING APPARATUS

BACKGROUND

Field of the Disclosure

The present disclosure relates to a heater, and more particularly to a heater to be used in an image forming apparatus, such as a copying machine and a laser printer.

Description of the Related Art

Typical image forming apparatuses, such as electrophotographic type copying machines and laser beam printers, fix unfixed images formed on recording materials by applying heat and pressure thereto with fixing apparatuses including heaters. A film heating method is proposed and put to practical use as a heating method used in a fixing apparatus. In the film heating method, a heat-resistant thin film is slid and conveyed by a pressure roller. A recording material bearing an unfixed image is heated and pressed at a nip portion formed by a heater and the pressure roller with a fixing film sandwiched therebetween, to fix the image onto the recording material.

A film heating type fixing apparatus can be configured with a low heat capacity member as a whole and thus can save power and shorten a wait time (have a quick start property). For example, a heater includes a substrate based on a plate-shaped ceramic base material with low heat capacity, such as alumina (Al2O3) and aluminum nitride (AlN). On one side of the substrate, a heating element using silver palladium (Ag/Pd), ruthenium oxide (RuO2), and the like, and an electrode made of a low resistance material, such as Ag, for energizing the heating element are formed through screen printing or the like. A heating element forming surface is covered with a thin glass protective layer.

Further, a thermistor made of a material having a resistance temperature characteristic in which a resistance value changes with temperature is arranged on the opposite surface of the heating element forming surface of the substrate. A conductor made of a low resistance material, such as Ag, is then formed to energize the thermistor. Examples of proposed thermistors includes one in which a chip-shaped thermistor element is adhered and arranged as discussed in Japanese Patent Application Laid-Open No. 6-186870 and one formed by pattern printing a paste-like thermistor material as discussed in Japanese Patent Application Laid-Open No. 8-297431.

A heater generates heat if a heating element is energized via an electrode. A temperature rise of the heater is detected by the thermistor and fed back to a control unit. The control unit controls energization so that the temperature of the heater detected by the thermistor becomes a target temperature. According to Japanese Patent Application Laid-Open No. 2018-194686, a configuration is discussed in which a plurality of thermistors is arranged in a heater and detects temperature distribution of the heater.

However, Ag, which is a constituent material of the conductor for energizing the thermistor, may be ionized and dissolved by an influence of moisture around the heater. There is a possibility that a movement of ions due to an electric field between the conductors causes a phenomenon referred to as migration that causes a short circuit between the conductors.

SUMMARY

According to an aspect of the present disclosure, a heater includes an elongated substrate, a heating element arranged on a first surface of the substrate, a first temperature detection element arranged on a second surface opposite of the first surface of the substrate, a second temperature detection element arranged on the second surface, a first conductor arranged on the second surface and connecting the first temperature detection element to a first power supply terminal, a second conductor arranged on the second surface and connecting the first temperature detection element and a first grounding terminal, a third conductor arranged on the second surface and connecting the second temperature detection element and a second power supply terminal, and a fourth conductor arranged on the second surface and connecting the second temperature detection element and a second grounding terminal. In a longitudinal direction of the heater, a distance from a center portion of the heater to the first temperature detection element is a first distance, and a distance from the center portion of the heater to the second temperature detection element is a second distance that is greater than the first distance. In a first area which is farther from the center portion of the heater than the second temperature detection element is from the center portion of the heater in the longitudinal direction of the heater, a distance between the first conductor and the second conductor in a transverse direction of the heater is a first inter-conductor distance and a distance between the third conductor and the fourth conductor in the transverse direction is a second inter-conductor distance that is greater than the first inter-conductor distance.

Further features of the present disclosure will become apparent from the following description of embodiments with reference to the attached drawings.

DESCRIPTION OF THE EMBODIMENTS

Various embodiments of the present disclosure will be described in detail below with reference to the accompanying drawings. It is noted that the following embodiments are not meant to limit the scope of the present disclosure as encompassed by the appended claims. Further, not all combinations of features described in the embodiments are essential for solving means of the present disclosure.

[Image Forming Apparatus]

Figure 1:
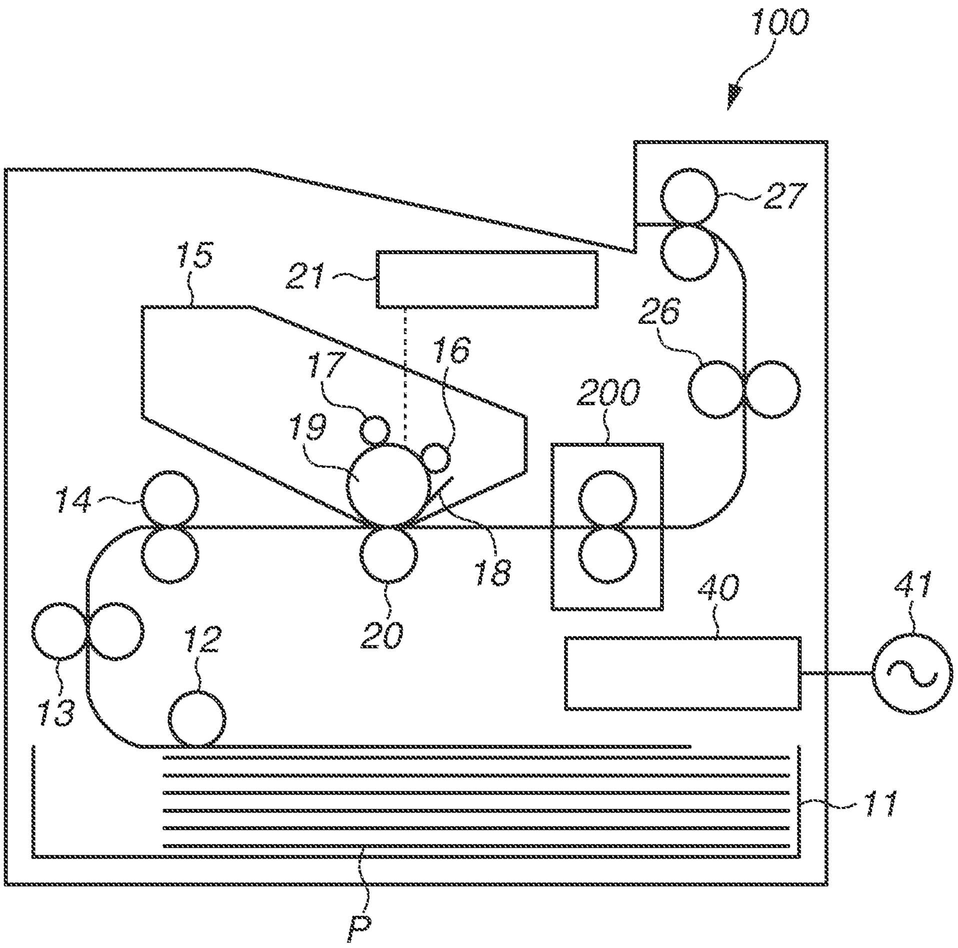
FIG. 1 is an outline configuration diagram of a laser printer.

A first embodiment will be described. FIG. 1 is an outline configuration diagram of a laser printer 100 serving as an image forming apparatus. A video controller of the laser printer 100 performs bitmapping of a character code, half-toning processing by performing dithering of a halftone image and the like, and other processes based on information received from an external apparatus (not illustrated) such as a host computer. The video controller then transmits a print signal and image information to an engine control unit. In response to receiving the image information from the video controller, the engine control unit emits a laser beam from a scanner unit 21 in accordance with the image information and scans a photosensitive drum 19 serving as a photosensitive member charged to a predetermined polarity by a charging roller 16. Thus, an electrostatic latent image is formed on the photosensitive drum 19. Toner is supplied from a development device 17 to the formed electrostatic latent image, and an image is formed on the photosensitive drum 19.

A recording material P, which is, for example, paper, loaded in a sheet feeding cassette 11 is fed one by one by a pickup roller 12 and conveyed toward a registration roller pair 14 by a conveyance roller pair 13. The conveyance of the recording material P from the registration roller pair 14 to a transfer portion is timed to the image formed on the photosensitive drum 19 reaching the transfer portion formed by the photosensitive drum 19 and a transfer roller 20. A transfer bias is applied to the transfer roller 20 when the recording material P passes through the transfer portion, so that the image on the photosensitive drum 19 is transferred to the recording material P.

The recording material P onto which the image has been transferred is heated and fixed by a fixing apparatus 200, so that the image is fixed to the recording material P. A control unit 40 controls power supply from a commercial alternating current (AC) power supply 41 to the fixing apparatus 200. The recording material P onto which the image has been fixed is discharged to a sheet discharge tray disposed on an upper part of the laser printer 100 by a conveyance roller pair 26 and a sheet discharge roller pair 27. The toner remaining on the photosensitive drum 19 is cleaned by a cleaner 18. The photosensitive drum 19, the charging roller 16, the scanner unit 21, the development device 17, and the transfer roller 20 described above configure an image forming unit for forming an image. The charging roller 16, the development device 17, the cleaner 18, and the photosensitive drum 19 are configured as a cartridge 15.

[Fixing Apparatus]

Figure 2:
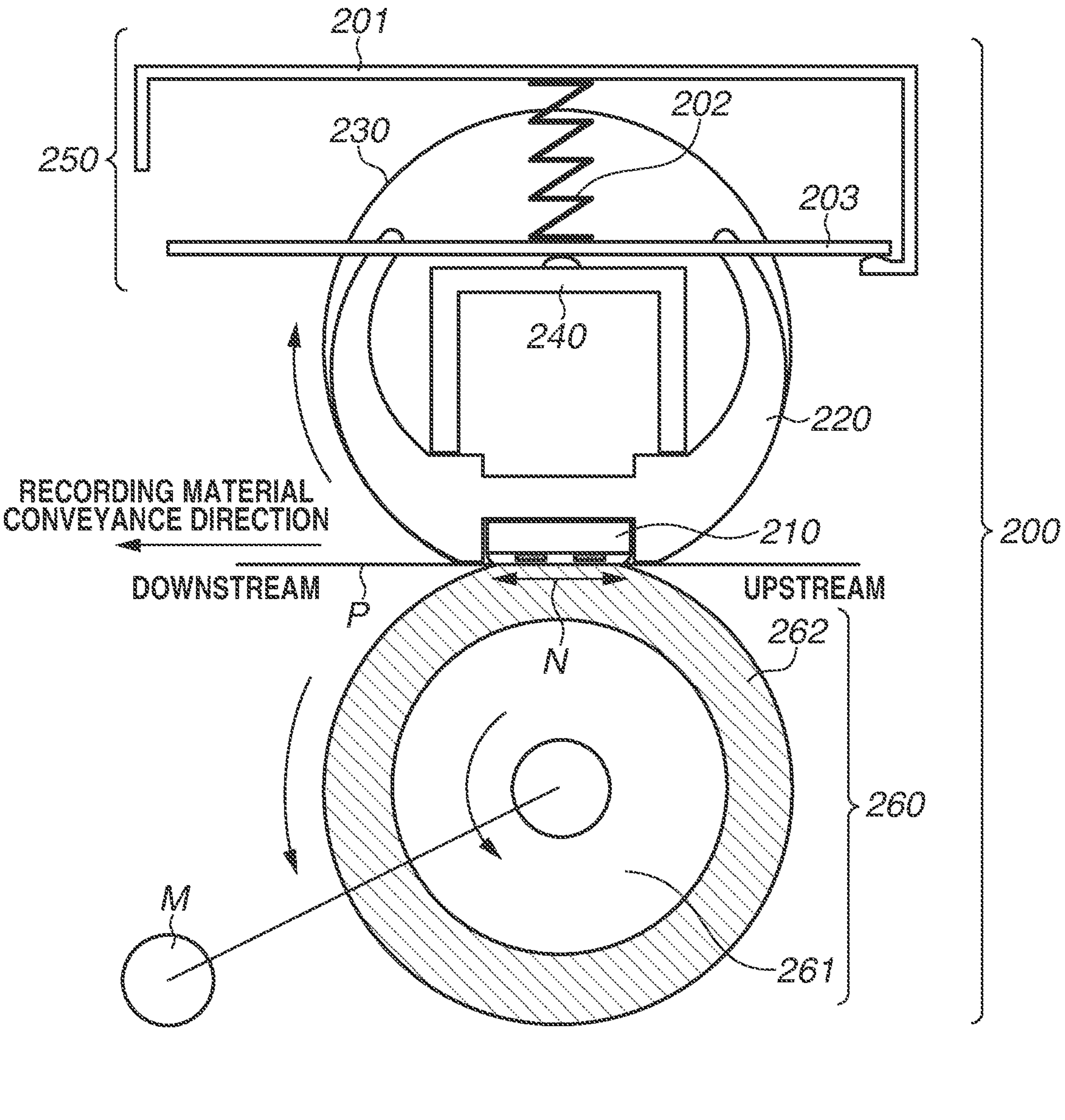
FIG. 2 is a sectional view of a fixing apparatus.

FIG. 2 is a sectional view of the fixing apparatus 200. The fixing apparatus 200 includes a thin heater 210, a heater holder 220, and a cylindrical film 230 that moves while sliding in contact with the heater 210. The fixing apparatus 200 further includes a pressure roller 260 that forms a nip portion N with the heater 210 via the film 230 and a pressure mechanism 250 that presses a pressure stay 240 toward the pressure roller 260.

The heater 210 is arranged in an internal space of the film 230, and the film 230 is sandwiched between the heater 210 and the pressure roller 260. The heater 210 includes a substrate based on a plate-shaped ceramic member, made of alumina ($Al_2O_3$), aluminum nitride (AlN), and the like, and a metal, such as stainless steel. Resistance heating element layers 212 (hereinbelow, also referred to as heating elements) is formed on one surface of the substrate, and a plurality of thermistors serving as temperature detection elements for detecting a temperature of the heater 210 is arranged on the other surface. A detailed configuration of the heater 210 will be described below with reference to FIGS. 3A and 3B. The heater 210 is supported on a seating surface of the heater holder 220 made of a heat-resistant resin, such as a liquid crystal polymer.

The film 230 includes a base made of a heat-resistant resin, such as polyimide, or metal, such as stainless steel, and an elastic layer made of a heat-resistant rubber or the like and a release layer made of a heat-resistant resin are provided on the base. The pressure roller 260 includes a metal core 261 made of iron, aluminum, or the like and an elastic layer 262 made of silicone rubber or the like, and receives a driving force from a motor M to rotate in a direction indicated by an arrow.

The pressure stay 240, which is a thick member made of a rigid member, such as a metal, is arranged to abut on the surface opposite to a heater supporting surface of the heater holder 220 and applies a pressure force to the pressure roller 260 side to form the nip portion N.

The pressure mechanism 250 includes a fixing frame 201, a pressure spring 202, and a pressure plate 203, and applies a pressure force of the pressure spring 202 held by the fixing frame 201 to both end portions of the pressure stay 240 in a longitudinal direction via the pressure plate 203. The applied pressure force is transmitted to the pressure roller 260 side via a contact portion with the heater holder 220, and thus the nip portion N is formed.

[Heater]

Figure 3A:
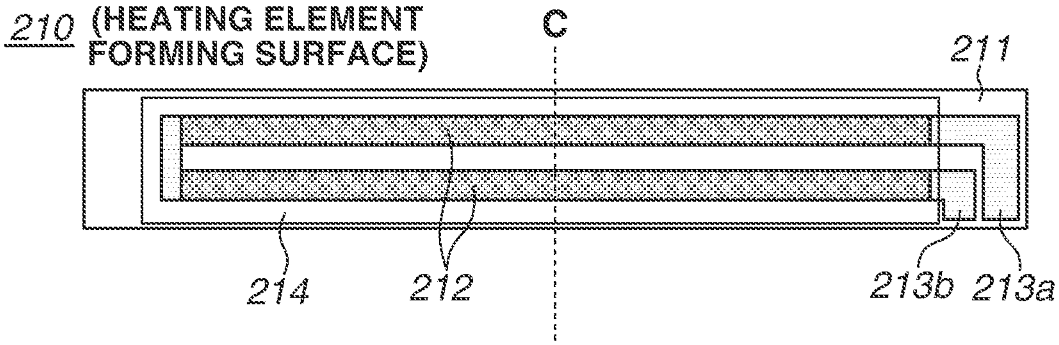
FIGS. 3A and 3B are outline configuration diagrams of a heater according to an embodiment.
Figure 3B:
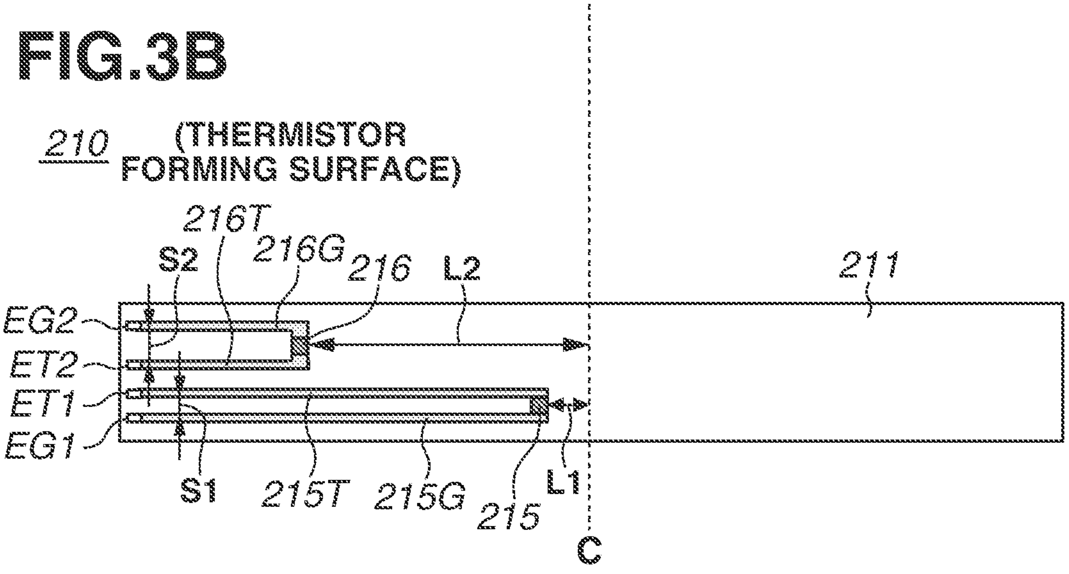

FIGS. 3A and 3B are outline configuration diagrams illustrating a configuration of the heater 210. A direction of a long side of the elongated heater 210 is referred to as a longitudinal direction (a horizontal direction in FIGS. 3A and 3B), a direction of the short side of the heater 210 orthogonal to the longitudinal direction is referred to as a transverse direction (a vertical direction in FIGS. 3A and 3B), and a direction of a thickness of the heater 210 orthogonal to the longitudinal direction and the transverse direction is referred to as a thickness direction (a front-to-back direction in FIGS. 3A and 3B).

FIG. 3A is a plan view of a first surface of the heater 210 on which the heating elements 212 are formed. The resistance heating element layers 212 (heating elements 212) that are arranged in the longitudinal direction of the heater 210 and generate heat by being energized, electrodes 213*a* and 213*b* for energizing the heating elements 212, and a protective layer 214 for insulating and protecting the heating elements 212 are formed on a substrate 211.

FIG. 3B is a plan view of a second surface of the heater 210 opposite to the first surface on which the heating elements 212 are formed. Thermistors are formed on the second surface. Thermistors 215 and 216 having negative resistance temperature characteristics are arranged on the substrate 211. According to the present embodiment, a type of a thermistor formed by pattern-printing of a paste-like thermistor material is used, but the thermistor is not limited to this type, and a chip-shaped thermistor element may be bonded and arranged.

The thermistor 215 is used for control to maintain the heater 210 at a target temperature. The thermistor 215 is arranged near a central portion in the longitudinal direction of the heater 210 (at a position of a distance L1 from a dotted line C passing through the central portion in the longitudinal direction of the heater 210). A conductor layer 215T serving as a first conductor for supplying the power to the thermistor 215 and a conductor layer 215G serving as a second conductor for grounding the thermistor 215 are formed on the substrate 211. The conductor layer 215T is connected to a power supply terminal ET1, and the conductor layer 215G is connected to a grounding terminal EG1.

According to the present embodiment, the conductor layer 215T, the conductor layer 215G, the power supply terminal ET1, the grounding terminal EG1, and areas between these conductors are uncovered exposed areas where moisture around the heater 210 can intervene. The conductor layer 215T and the conductor layer 215G are spaced an inter-conductor distance S1 apart in the vicinity of the power supply terminal ET1 and the ground terminal EG1, respectively. The power supply terminal ET1 and the grounding terminal EG1 are connected to a heater drive circuit 400, which is described below, by a connector (a terminal pressure contact type connector according to the present embodiment, not illustrated). The conductor layer 215G and the grounding terminal EG1 are grounded via the heater drive circuit 400.

The thermistor 216 is used, in a case where the recording material P having a length in the longitudinal direction shorter than that of the respective heating elements 212 is to be fixed, to detect an excessive temperature rise that may occur at an end portion in the longitudinal direction of the heater 210 and to detect a temperature drop at the end portions after printing. The thermistor 216 is arranged near the end portion in the longitudinal direction of the heater 210 (at a position of a distance L2 from the dotted line C passing through the central portion in the longitudinal direction of the heater 210). A conductor layer 216T serving as a third conductor for supplying the power to the thermistor 216 and a conductor layer 216G serving as the second conductor for grounding the thermistor 216 are formed on the substrate 211. The conductor layer 216T is connected to a power supply terminal ET2, and the conductor layer 216G is connected to a grounding terminal EG2.

In the present embodiment, the conductor layer 216T, the conductor layer 216G, the power supply terminal ET2, the grounding terminal EG2, and areas between these conductors are uncovered exposed areas where moisture around the heater 210 can intervene. The conductor layer 216T and the conductor layer 216G are spaced an inter-conductor distance S2 apart in the vicinity of the power supply terminal ET2 and the grounding terminal EG2, respectively. The power supply terminal ET2 and the grounding terminal EG2 are connected to the heater drive circuit 400, which is described below, by a connector (a terminal pressure contact type connector according to the present embodiment, not illustrated). The conductor layer 216G and the grounding terminal EG2 are grounded via the heater drive circuit 400.

In the present embodiment, a relationship between the distance L1 and the distance L2 is L2>L1. In this case, a relationship between the inter-conductor distance S1 and the inter-conductor distance S2 is S2>S1. In other words, the inter-conductor distance S2 in the thermistor 216 arranged at the position near the end portion is longer than the inter-conductor distance S1 in the thermistor 215 arranged at the position near the central portion in the longitudinal direction of the heater 210. The reason for this arrangement will be described in detail below. The inter-conductor distances herein indicates a distance in a first area on the end portion side of the thermistor 216.

Figure 4:
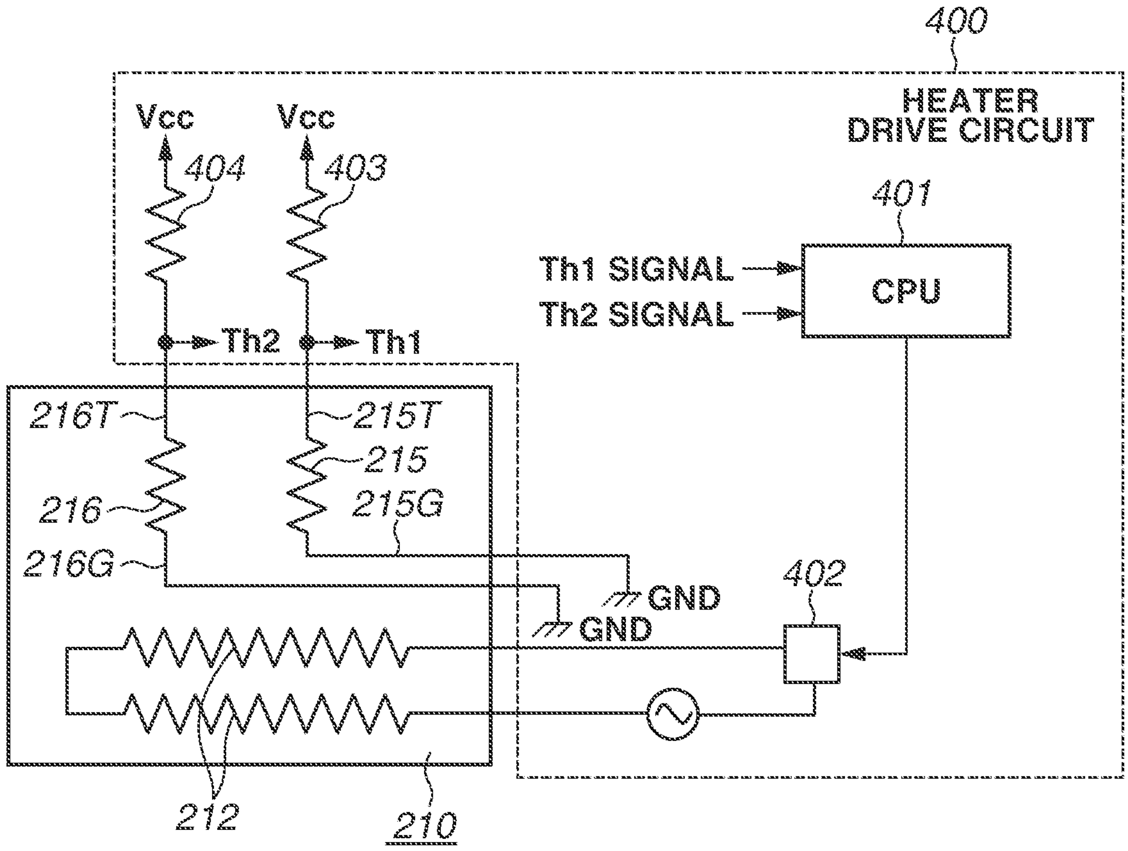
FIG. 4 is an outline configuration diagram of a heater drive circuit.

FIG. 4 illustrates the heater drive circuit 400 for controlling power supply to the heater 210. The thermistor 215 is connected in series with a pull-up resistor 403 in the heater drive circuit 400, and a direct current (DC) Vcc voltage is applied thereto. Partial pressure information corresponding to a temperature of the thermistor 215 is input to a central processing unit (CPU) 401 as a Th1 signal and converted into temperature information about the thermistor 215. The CPU 401 controls an amount of power to be supplied to the heater 210 by switching ON/OFF timing using a triac 402, based on the temperature information about the thermistor 215. The CPU 401 then controls the temperature of the heater 210 based on the target temperature. In the present embodiment, the CPU 401 performs control based on phase control by which energization is started at a timing corresponding to a predetermined phase angle from zero crossing of an AC voltage waveform.

Similarly, the thermistor 216 is connected in series with a pull-up resistor 404 in the heater drive circuit 400, and the DC Vcc voltage is applied thereto. Partial pressure information corresponding to the temperature of the thermistor 216 is input to the CPU 401 as a Th2 signal and converted into temperature information about the thermistor 216. The thermistor 216 detects the temperature near the end portion in the longitudinal direction of the heater 210 as described above.

Figure 5:
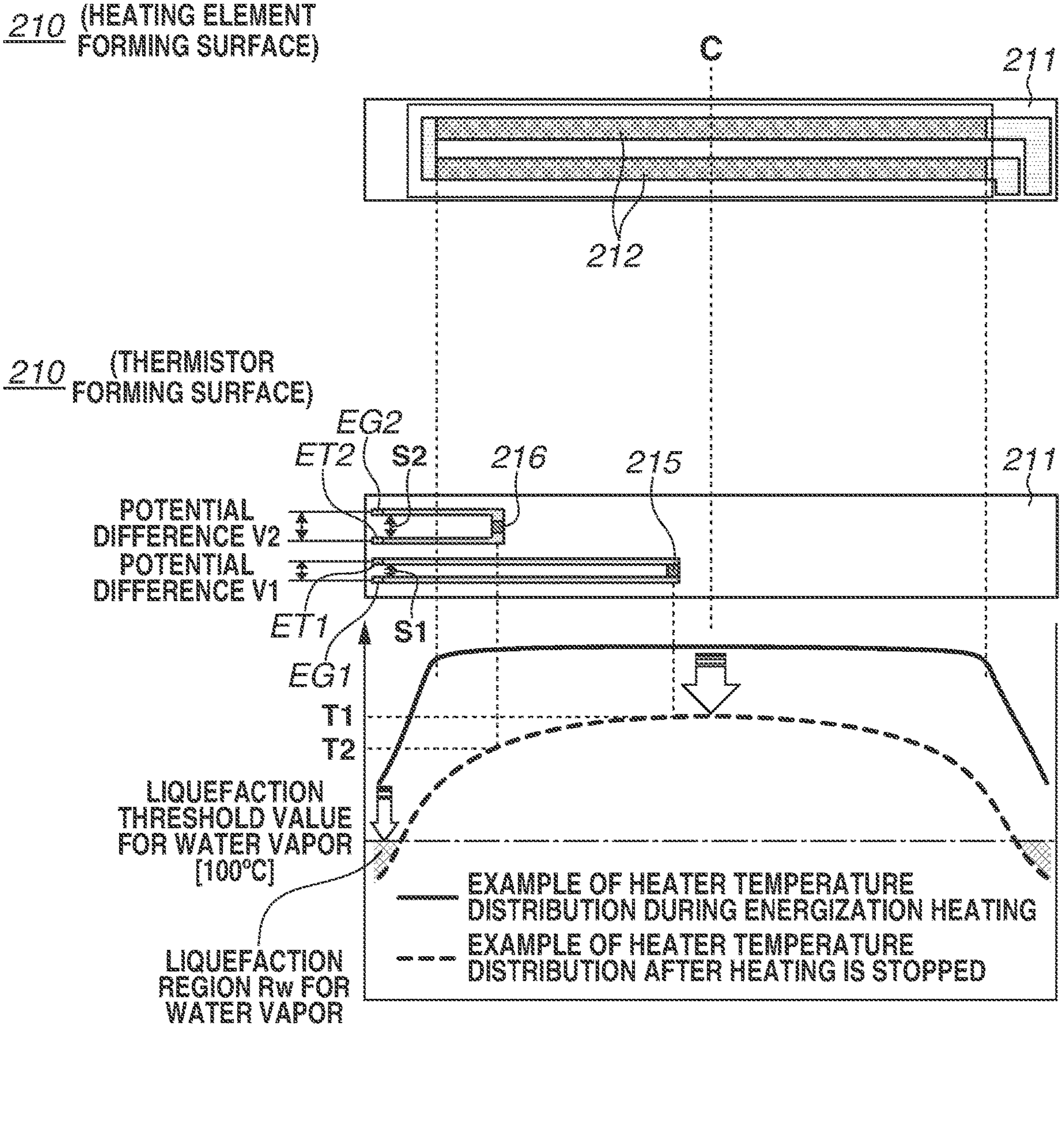
FIG. 5 illustrates temperature distribution in a longitudinal direction of the heater.

FIG. 5 illustrates an example of temperature distribution in the longitudinal direction of the heater 210 in a case where the heater 210 is powered and heated by the heater drive circuit 400 and in a case where the heating is stopped.

The temperature distribution indicated by a solid line in FIG. 5 is the temperature distribution of the heater 210 during a period in which control is performed so as to maintain the predetermined target temperature based on a detected temperature of the thermistor 215. During a period in which the heater 210 is supplied with power to be heated, a heat generation amount of the heater 210 is greater than a heat dissipation amount of the entire fixing apparatus 200. Thus, an area in which the heating elements 212 are formed is maintained in a temperature range close to the temperature of the thermistor 215, and, in areas near the both end portions in the longitudinal direction where the heating elements 212 are not formed, the temperature drops due to heat dissipation to air around the heater 210. However, in a case where a fixing temperature is 200° C. or higher, the temperature distribution including the both end portions where the temperature drops exceeds a liquefaction threshold value for water vapor (100° C., an alternate long and short dash line in FIG. 5).

The temperature distribution indicated by a dotted line in FIG. 5 is the temperature distribution of the heater 210 during a period in which heating is stopped. If heating is stopped, the heater 210 does not generate heat, and the dissipation amount of the fixing apparatus 200 becomes greater than the heat generation amount of the heater 210. A heat dissipation rate near the end portion is higher than that near the central portion in the longitudinal direction of the heater 210, so that the temperature of the heater 210 exhibits parabolic temperature distribution in which a difference gradually widens from the central portion to the both end portions in the longitudinal direction.

As the temperature of the heater 210 decreases, regions Rw (shaded areas in FIG. 5) below the liquefaction threshold value for water vapor appear at the end portions in the longitudinal direction of the heater 210. In other words, water vapor around the fixing apparatus 200 begins to intervene as liquefied moisture in the vicinity of each terminal of the conductor layers 215T, 215G, 216T, and 216G on a thermistor forming surface of the heater 210. Here, the DC voltage from the heater drive circuit 400 is being applied to the thermistors 215 and 216. In other words, there is a potential difference between the conductor layers 215T and 215G (hereinbelow, such an area is also referred to as an area between 215T-G for thermistor 215), and between the conductor layers 216T and 216G (hereinbelow, such an area is also referred to as an area between 216T-G for thermistor 216). Thus, Ag forming the conductor layers is ionized and dissolved in the liquefied moisture, and a phenomenon in which Ag ions are attracted to an opposite pole side, that is, a migration phenomenon begins to occur.

At this time, different potential differences are applied to the area between 215T-G for thermistor 215 and the area between 216T-G for thermistor 216 due to the above-described temperature distribution. The thermistors according to the present embodiment have negative resistance temperature characteristics. Thus, in the above-described temperature distribution, that is, the parabolic temperature distribution, a resistance value of the thermistor 216, which is closer to the end portion in the longitudinal direction and has a lower temperature (temperature T2), is greater than a resistance value of the thermistor 215, which is closer to the central portion in the longitudinal direction and has a higher temperature (temperature T1). If the resistance value of the thermistor is large, the potential difference between the conductors sandwiching the thermistor is large, so that a potential difference V2 applied to the area between 216T-G for thermistor 216 is greater than a potential difference V1 applied to the area between 215T-G for thermistor 215. A progress rate of the migration phenomenon is generally proportional to the potential difference, so that the migration phenomenon progresses more easily in the area between 216T-G for thermistor 216 than in the area between 215T-G for thermistor 215 in terms of the potential difference.

In contrast, a distance between the conductor layers 216T and 216G (the inter-conductor distance S2) is greater than a distance the conductor layers 215T and 216G(the inter-conductor distance S1). The progress rate of the migration phenomenon is generally inversely proportional to the distance between the conductors, so that it is more difficult for the migration phenomenon to progress in the area between 216T-G for thermistor 216 than in the area between 215T-G for thermistor 215 in terms of the distance between the conductors.

In other words, in terms of both of the potential differences and the distances between the conductors, the migration progress rate is opposite in the area between 215T-G for thermistor 215 and in the area between 216T-G for thermistor 216. Thus, the migration progress rate of the thermistor 216 arranged on the end portion side in the longitudinal direction of the heater 210 and the migration progress rate of the thermistor 215 arranged on the central portion side in the longitudinal direction are enabled to fall within a similar range. More desirably, a ratio S2/S1 of the inter-conductor distance S2 to the inter-conductor distance S1 is adjusted to match a ratio V2/V1 of the potential difference V2 to be applied to the thermistor 216 to the potential difference V1 to be applied to the thermistor 215 while heating is stopped. Thus, the migration progress rates can be matched in the area between 215T-G for thermistor 215 and in the area between 216T-G for thermistor 216.

Increasing both of the inter-conductor distances S1 and S2 is beneficial in controlling the migration phenomenon. However, an increase in the distance between the conductors leads to an increase in size of the substrate, which in turn leads to an increase in size of the heater 210 and the fixing apparatus 200. As described in the present embodiment, the inter-conductor distances S1 and S2 are adjusted in accordance with the ratio of the potential differences of the thermistor 215 and the thermistor 216, so that it is possible to control the occurrence of the migration phenomenon and also prevents the size increase.

Next, a description will be provided of a case where the inter-conductor distance S2 of the thermistor 216 and the inter-conductor distance S1 of the thermistor 215 are the same, as a comparative example. In the comparative example, the temperature distribution in the longitudinal direction of the heater 210 is the same as that according to the present embodiment. The water vapor around the fixing apparatus 200 begins to intervene as liquefied moisture in the vicinity of the end portions in the longitudinal direction of the heater 210 after heating is stopped. As in the present embodiment, the potential difference V2 applied to the thermistor 216 is greater than the potential difference V1 applied to the thermistor 215. In this situation, in a case where the inter-conductor distance S2 is equal to the inter-conductor distance S1, the migration progress rate in the area between 216T-G for thermistor 216 is faster than the migration progress rate in the area between 215T-G for thermistor 215.

Table 1 indicates an example in which a heating and cooling cycle test is performed on the fixing apparatus 200 under a high-temperature and high-humidity environment, and the present embodiment is compared to the comparative example, with respect to a total energization time until a detection temperature of the thermistor is affected by the migration.

TABLE 1

| | Energization Time until Thermistor Detection Temperature is Affected |
|---|---|
| First Embodiment | 700 hours or more and 1000 hours or less |
| Comparative Example | 350 hours or more and 500 hours or less |

For example, in a case where an expected service life satisfying the quality of the fixing apparatus 200 is 300 hours as the total time of the energization time, the influence of the migration appears in a relatively short time after the expected service life is exceeded in the comparative example, as indicated in Table 1. In contrast to this, it can be seen that, in the present embodiment, the time until the influence of the migration appears is relatively longer than that in the comparative example, and the occurrence of migration can be controlled. In other words, it can also be said that the present embodiment enables control of a defect occurring in the fixing apparatus 200 due to the migration, thus extending a usable period of the fixing apparatus 200.

In the present embodiment, the configuration in which two thermistors are arranged in the heater 210 and each thermistor is connected to one conductor layer that is to be grounded has been described as an example. The present disclosure is not limited to this configuration and may include a configuration illustrated in FIG. 6. More specifically, three or more thermistors can be arranged in a heater 310, and two or more thermistors can be connected to a conductor layer that is to be grounded.

Figure 6:
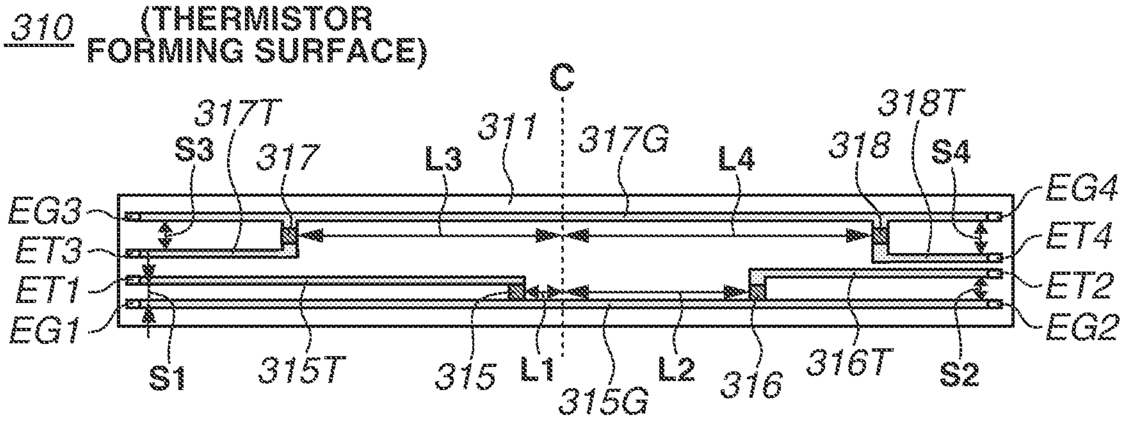
FIG. 6 is an outline configuration diagram of a heater according to an embodiment.

FIG. 6 is an outline configuration diagram illustrating the heater 310 as a modification according to the present embodiment. A thermistor 315 is arranged at a position of the distance L1 from the dotted line C passing through the central portion in the longitudinal direction of the heater 310. A thermistor 316 is arranged at a position of the distance L2 from the dotted line C passing through the central portion in the longitudinal direction of the heater 310. A thermistor 317 is arranged at a position of a distance L3 from the dotted line C passing through the central portion in the longitudinal direction of the heater 310. A thermistor 318 is arranged at a position of a distance L4 from the dotted line C passing through the central portion in the longitudinal direction of the heater 310.

The thermistors 315 and 316 are connected to a conductor layer 315G that is connected to the grounding terminals EG1 and EG2. The thermistors 317 and 318 are connected to a conductor layer 317G that is connected to grounding terminals EG3 and EG4. The thermistor 315 is further connected to a conductor layer 315T that is connected to the power supply terminal ET1. The thermistor 316 is connected to a conductor layer 316T that is connected to the power supply terminal ET2. The thermistor 317 is connected to a conductor layer 317T that is connected to a power supply terminal ET3. The thermistor 318 is connected to a conductor layer 318T that is connected to a power supply terminal ET4. The thermistor 315 has the inter-conductor distance S1, the thermistor 316 has the inter-conductor distance S2, the thermistor 317 has an inter-conductor distance S3, and the thermistor 317 has an inter-conductor distance S4.

A relationship of each thermistor and the distance from the central portion in the longitudinal direction of the heater 310 is $L1<L2<L3<L4$. The inter-conductor distance of each thermistor is $S1<S2<S3<S4$. This enables the migration progress rate in each of the thermistors 315, 316, 317, and 318 to be kept within a similar range.

As described above, the inter-conductor distance of the conductor connected to the corresponding thermistor is set according to the distance from the central portion to the thermistor in the longitudinal direction of the heater, thus controlling the occurrence of migration.

A second embodiment of the present disclosure will be described below. In the present embodiment, a configuration is described in which part of a conductor layer connected to a thermistor is covered with a protective member. A detailed description of a configuration similar to that in the above-described first embodiment, such as an image forming apparatus, is omitted here.

Figure 7:
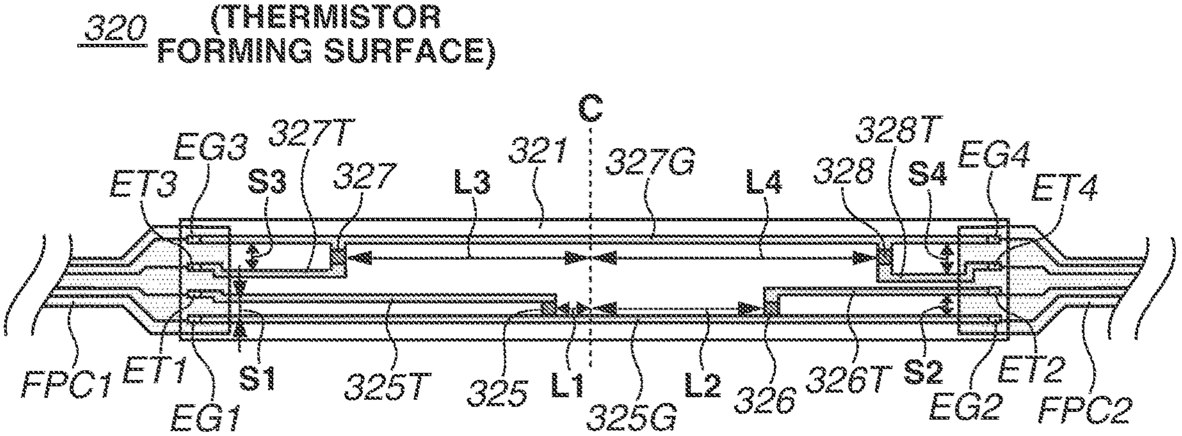
FIG. 7 is an outline configuration diagram of a heater according to an embodiment.

FIG. 7 is an outline configuration diagram illustrating a heater 320 according to the present embodiment. An arrangement of a plurality of thermistors in the heater 320 is similar to that of the heater 310 illustrated in FIG. 6 according to the above-described first embodiment.

Flexible printed circuits (FPCs), which are terminal connection connectors and serve as protective members for protecting the conductor layer, are joined to the end portions in the longitudinal direction of the heater 320. A protective member joined to the end portion on one side is an FPC1, and a protective member connected to the end portion on the other side is an FPC2. Adjacent terminals of the power supply terminals ET1 to ET4 and the grounding terminals EG1 to EG4, which are arranged at the corresponding end portion in the longitudinal direction of the heater 320, are equidistant from each other. Further, the power supply terminals ET1 to ET4 and the grounding terminals EG1 to EG4 are configured to overlap and to be covered with a conductor wire connection portion of the corresponding one of the protective members FPC1 and FPC2.

The FPCs 1 and 2, which are the protective member in the present embodiment, each have a structure in which a copper foil pattern serving as a conductor wire is sandwiched between polyimide films via an adhesive layer, and the copper foil pattern is exposed at the conductor wire connection portion. The conductor wire connection portions of the FPCs 1 and 2 are connected to the corresponding power supply terminals ET1 to ET4 and the corresponding grounding terminals EG1 to EG4 of the heater 320 by soldering or the like. At this time, the portion other than a solder joint is filled with an insulating rosin resin-based flux in the overlapping portions of the heater 320 and the respective FPC1 and the FPC2. Thus, the end portion area in the longitudinal direction of the heater 320 including the conductor layer is sealed to function as the protective member against water vapor around the heater 320. Further, the inter-conductor distances are arranged so that $S1=S2=S3=S4$ is satisfied in the areas covered with the protective members. The area covered with the protective member is referred to as a second area on the end portion side compared to the first area.

The inter-conductor distances S1 to S4 are set in a manner similar to that in the above-described first embodiment in areas where the protective member is not formed in the end portion areas in the longitudinal direction of the heater 320. In other words, the inter-conductor distances S1 to S4 are each varied depending on the corresponding distances L1 to L4 of the thermistors 325, 326, 327, and 328 from the central portion of the heater 320. As in the first embodiment, the respective inter-conductor distance is set to satisfy $S1<S2<S3<S4$ according to the distance $L1<L2<L3<L4$.

As described above, in a case where the protective member is formed in each end portion in the longitudinal direction of the heater 320, liquefied moisture is less likely to intervene in the vicinity of the conductor layer in the area where the protective member is formed even after the fixing apparatus stops heating, so that the migration phenomenon is less likely to occur. In contrast to this, in the area where the protective member is not formed, liquefied moisture begins to intervene between the conductor layers if the temperature falls below the liquefaction threshold value for water vapor, and a potential difference applied to the thermistor may cause the migration phenomenon. Thus, in an exposed area where the protective member is not formed, the inter-conductor distance of the conductor connected to the thermistor is set according to the distance from the central portion to the thermistor in the longitudinal direction of the heater, thus controlling the occurrence of migration.

A third embodiment of the present disclosure will be described below. In the present embodiment, a description will be provided of a configuration in which an entire area of a conductor layer connected to a thermistor is covered with a plurality of types of protective members. A detailed description of a configuration similar to that according to the above-described first and second embodiments is omitted here.

Figure 8A:
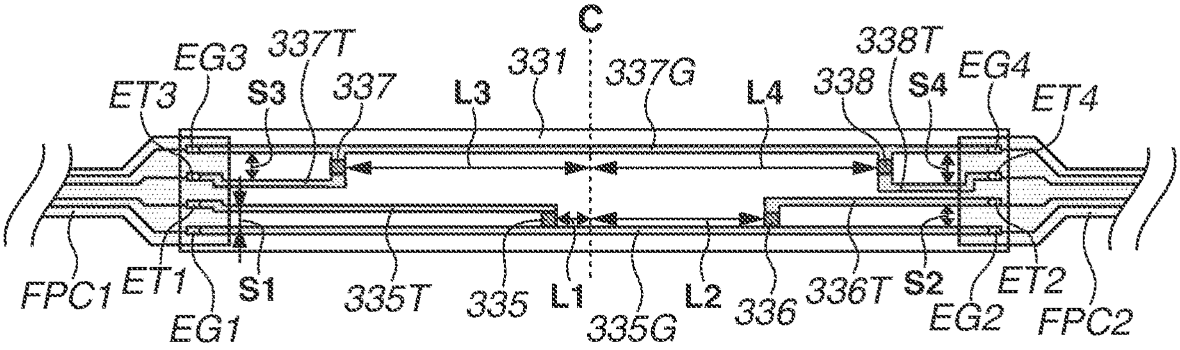
FIGS. 8A and 8B are outline configuration diagrams of a heater according to an embodiment.
Figure 8B:
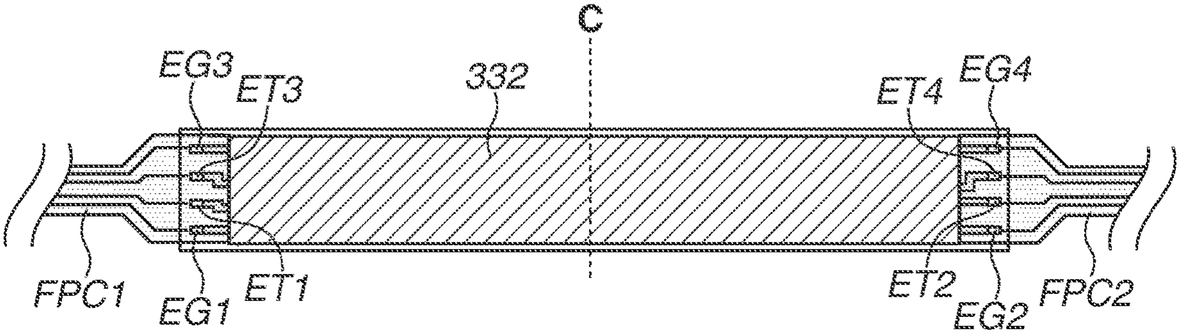

FIGS. 8A and 8B are outline configuration diagrams illustrating a heater 330 according to the present embodiment. As illustrated in FIG. 8A, an arrangement of a plurality of thermistors formed in the heater 330 is similar to that of the heater 320 illustrated in FIG. 7 according to the above-described second embodiment. A configuration in which the FPC1 and the FPC2 serving as the protective members are joined to the corresponding end portions in the longitudinal direction of the heater 330 is also similar to that in FIG. 7.

According to the present embodiment, as illustrated in FIG. 8B, a thermally conductive glass member 332 serving as a second protective member is formed to cover the area where the FPC1 and the FPC2 serving as first protective members are not formed, so that there is no portion where the conductor layer is exposed. In a case where there is a difference between sealing performance of the FPC1 and the FPC2 serving as the first protective member and sealing performance of the thermally conductive glass member 332 as the second protective member, the inter-conductor distances S1 to S4 of the conductor layers formed in an area where the protective member(s) with the lower sealing performance is formed are set according to the distance from the central portion to the thermistor in the longitudinal direction of the heater 330. According to the present embodiment, the sealing performance of the first protective member and the sealing performance of the second protective member are checked through a following preliminary verification.

[Preliminary Verification]

A heating and cooling cycle test of the fixing apparatus 200 including the heater 330 is conducted, and the heater 330 is removed from the fixing apparatus 200 after 500 hours of energization heating time has passed. A penetrating state of a penetrant to an interface between a substrate 331 of the heater 330 and each protective member is checked through the following test method which is compliant with JIS Z2343 penetrant testing.

Penetrant: high sensitivity fluorescent water washable penetrant NEO GLO F-4A-E PLUS (manufactured by Eishin Kagaku Co., LTD)

Penetration time: 24 hours

Ultraviolet (UV) light: UV-light emitting diode (LED) Light ZB-365J (manufactured by Eishin Kagaku Co., LTD)

The test is finished when penetration of the penetrant is recognized in any of the protective members. If no penetration is recognized, the test is repeated.

As a result of the preliminary verification, penetration of the penetrant from the interface between the thermally conductive glass member 332 serving as the second protective member and the substrate 331 was observed after 1500 hours of energization heating time passed. In other words, it was recognized that the sealing performance of the thermally conductive glass member 332 is lower than the sealing performance of the FPC.

In view of this result, the inter-conductor distances S1 to S4 are varied depending on the distances L1 to L4 of respective thermistors 335, 336, 337, and 338 from the central portion of the heater 330 in the end portion areas in the longitudinal direction of the heater 330 in a forming area of the thermally conductive glass member 332. As in the second embodiment, the respective inter-conductor distance is set to satisfy S1<S2<S3<S4 according to the distance L1<L2<L3<L4. In this way, the inter-conductor distance of the respective conductor connected to the corresponding thermistor is set according to the distance from the central portion to the thermistor in the longitudinal direction of the heater, thus controlling the occurrence of migration.

Figure 9A:
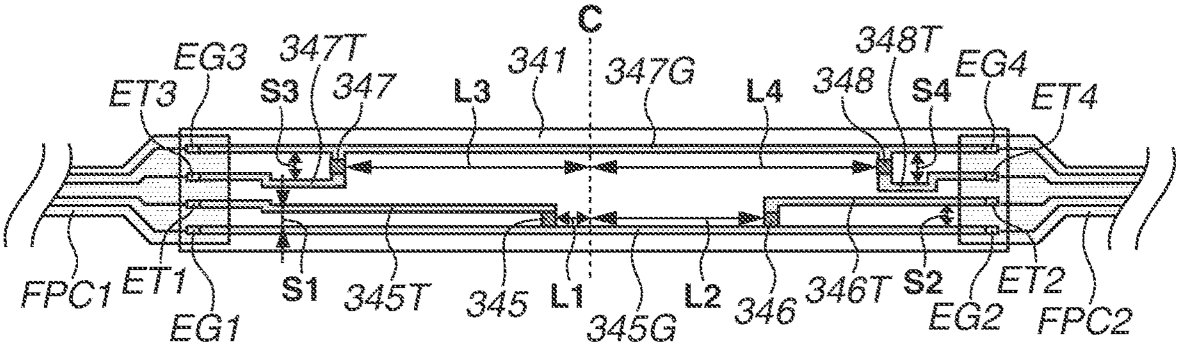
FIGS. 9A, 9B, and 9C are outline configuration diagrams of a heater according to an embodiment.
Figure 9B:
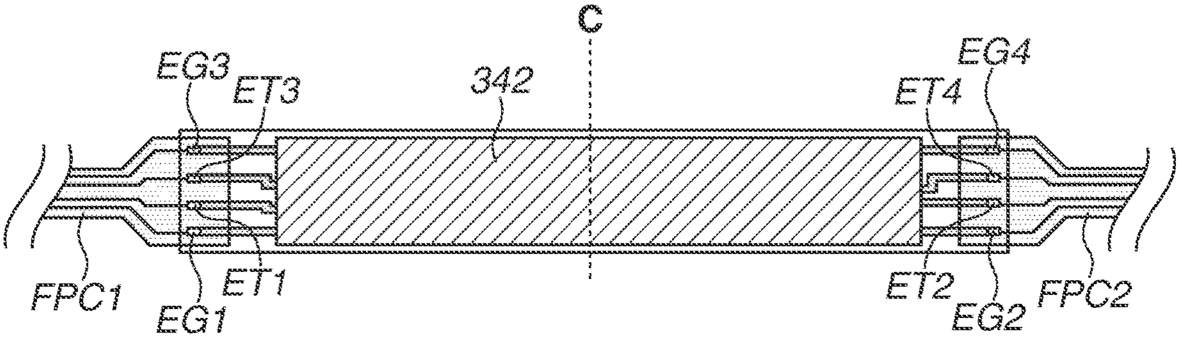
Figure 9C:
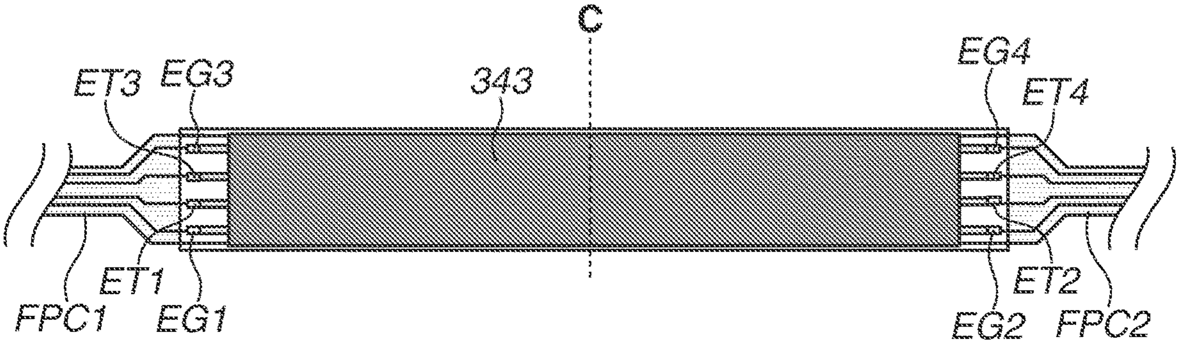

FIGS. 9A, 9B, and 9C are outline configuration diagrams illustrating a modification of a heater according to the present embodiment. As illustrated in FIG. 9A, an arrangement of a plurality of thermistors formed in a heater 340 is similar to that of the heater 330 illustrated in FIGS. 8A and 8B. A configuration in which the FPC1 and the FPC2 serving as the protective members are joined to the end portions in the longitudinal direction of the heater 340 is also similar to that in FIGS. 8A and 8B.

As illustrated in FIGS. 9B and 9C, a thermally conductive glass member 342 serving as the second protective member is formed to cover the area where the FPC1 and the FPC2 serving as the first protective members are not formed. Further, a pressure resistant glass member 343 serving as a third protective member is formed to cover the conductor layer so that conductor layer includes no exposed portion.

In checking the sealing performances of the three protective members through the above-described preliminary verification, penetration of the penetrant from an interface between the pressure resistant glass member 343 serving as the third protective member and a substrate 341 was observed after 2000 hours of energization heating time passed. In other words, it was recognized that the sealing performance of the pressure resistant glass member 343 is lower than the sealing performance of the FPC and the sealing performance of the thermally conductive glass member 342. The inter-conductor distances S1 to S4 are varied depending on the corresponding one of the distances L1 to L4 of the thermistors 345, 346, 347, and 348, respectively, from the central portion of the heater 340 in the end portion areas in the longitudinal direction of the heater 340 in a forming area of the thermally conductive glass member 342 with low sealing performance. As in the second embodiment, the respective inter-conductor distance is set to satisfy S1<S2<S3<S4 according to the distance L1<L2<L3<L4. In this way, the inter-conductor distance of the respective conductor connected to the corresponding thermistor is set according to the distance from the central portion to the thermistor in the longitudinal direction of the heater, thus controlling the occurrence of migration.

In a case where a plurality of types of protective members is formed in an entire area of the conductor layer connected to the thermistor as in the present embodiment, there is a possibility that liquefied moisture enters between the conductor layers from the interface between the substrate and a protective member in the forming area of the protective member with the lowest sealing performance. Further, the migration phenomenon may occur due to the potential difference applied to the thermistor. Thus, the inter-conductor distance of the conductor connected to the thermistor is set according to the distance from the central portion to the thermistor in the longitudinal direction of the heater in the end portion area in the longitudinal direction of the area where the protective member with the lowest sealing performance is formed. This enables the control of the occurrence of migration.

A fourth embodiment of the present disclosure will be described below. According to the present embodiment, a configuration is described in which a heating element formed in a heater is divided into a plurality of heating blocks in the longitudinal direction of the heater. A detailed description of a configuration similar to that according to the above-described first to third embodiments, such as an image forming apparatus, is omitted here.

Figure 10A:
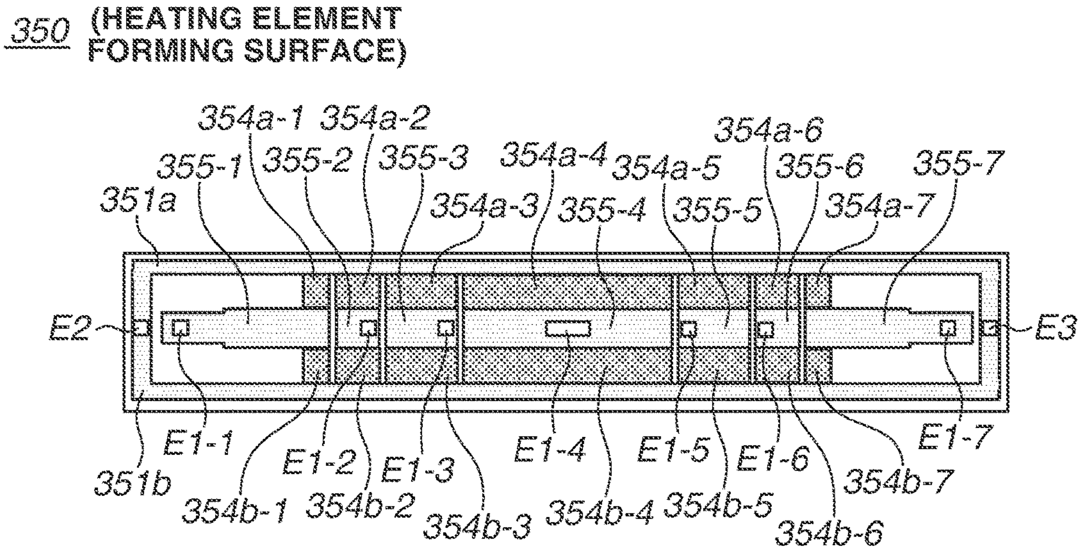
FIGS. 10A and 10B are outline configuration diagrams of a heater according to an embodiment.
Figure 10B:
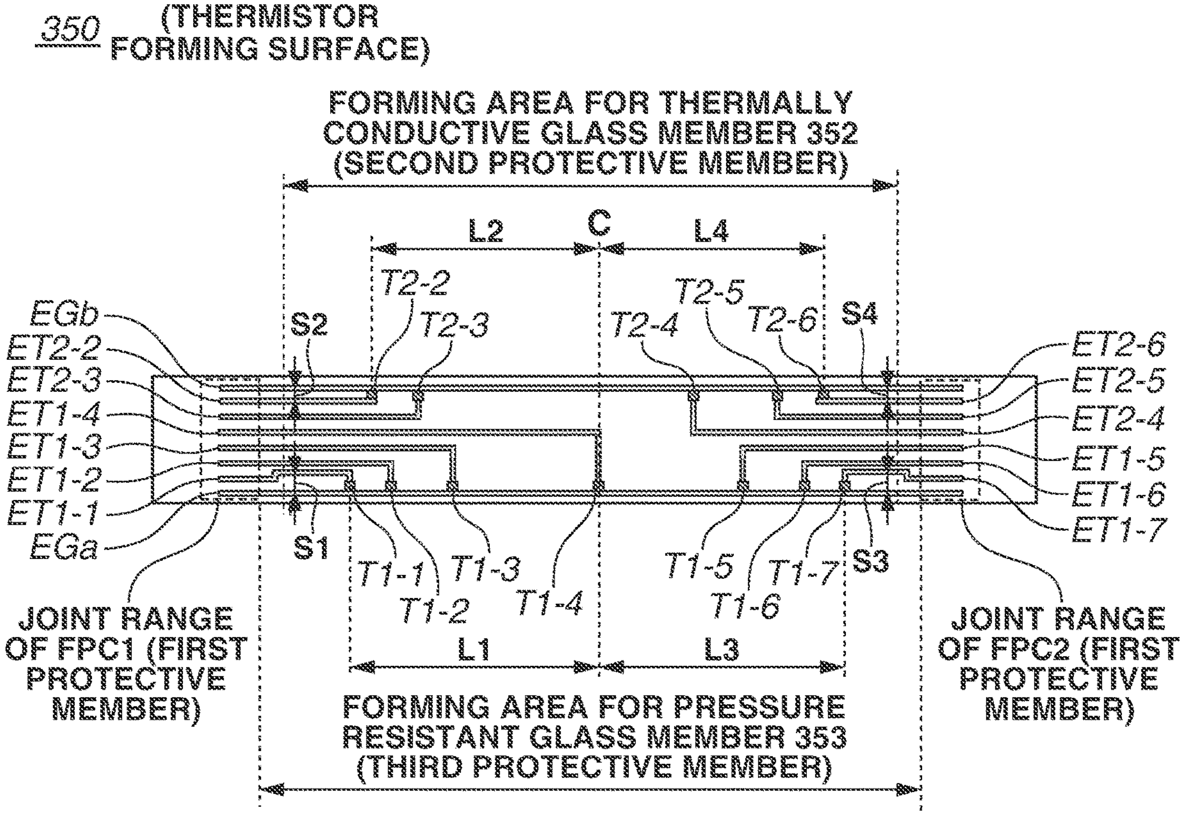

FIGS. 10A and 10B are outline configuration diagrams illustrating a configuration of a heater 350. FIG. 10A is a plan view of a first surface of the heater 350 on which heating elements are formed. The heating elements are divided into a plurality of heating blocks in the longitudinal direction of the heater 350. Electric power is supplied to divided heating elements 354*a*-1 to 354*a*-7 and heating elements 354*b*-1 to 354*b*-7 using electrodes E-1 to E-7 and common electric power E2 and E3. The electrodes and the heating elements are connected by conductor layers 355-1 to 355-7, a conductor layer 351*a*, and a conductor layer 351*b* serving as the conductors.

FIG. 10B is a plan view of a second surface of the heater 350. A plurality of thermistors for detecting a temperature of the corresponding heating block is arranged to the plurality of divided heating blocks. Power supply to the plurality of heating elements is controlled based on the detection result of the thermistors. In FIG. 10B, the FPC1 and the FPC2 serving as the first protective members are joined to the end portions in the longitudinal direction of the heater 350. Further, a thermally conductive glass member 352 serving as the second protective member is formed, and a pressure resistant glass member 353 serving as the third protective member is formed thereon. Here, a technical concept of the inter-conductor distance described above according to the first to third embodiments is applied to the end portion areas in the longitudinal direction of the heater 350 in a forming area of the thermally conductive glass member 352 with the lowest sealing performance in the protective members.

More specifically, from the central portion in the longitudinal direction of the heater 350, a distance to a thermistor T1-1 is defined as L1, a distance to a thermistor T2-2 is defined as L2, a distance to a thermistor T1-7 is defined as L3, and a distance to a thermistor T2-6 is defined as L4. A relationship of each distance is expressed as L1>L2 and L3>L4. An inter-conductor distance between a conductor layer EGa and a conductor layer ET1-1 connected to the thermistor T1-1 is defined as S1. An inter-conductor distance between a conductor layer EGb and a conductor layer ET2-2 connected to the thermistor T2-2 is defined as S2. An inter-conductor distance between the conductor layer EGa and a conductor layer ET1-7 connected to the thermistor T1-7 is defined as S3. An inter-conductor distance between the conductor layer EGb and a conductor layer ET2-6 connected to the thermistor T2-6 is defined as S4. The inter-conductor distances are set to satisfy S1>S2 and S3>S4 according to the above-described distances L1>L2 and L3>L4.

According to the first to fourth embodiments, the surface on which the heating elements are formed is a surface that slides on the film 230, but the present disclosure is not limited to this configuration. A surface on which the thermistor is formed and the protective member is formed thereon may be the surface that slides on the film 230.

Further, the configurations according to the first to fourth embodiments are applicable to a fixing apparatus that includes a sliding plate between a film and a heater in addition to the configuration in which the surface of the heater slides directly against a film.

According to the present disclosure, the occurrence of migration can be controlled.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-010584, filed Jan. 27, 2022, which is hereby incorporated by reference herein in its entirety.

What is claimed is:

1. A heater comprising:

an elongated substrate;

a heating element arranged on a first surface of the substrate;

a first temperature detection element arranged on a second surface opposite of the first surface of the substrate;

a second temperature detection element arranged on the second surface;

a first conductor arranged on the second surface and connecting the first temperature detection element to a first power supply terminal;

a second conductor arranged on the second surface and connecting the first temperature detection element and a first grounding terminal;

a third conductor arranged on the second surface and connecting the second temperature detection element and a second power supply terminal; and a fourth conductor arranged on the second surface and connecting the second temperature detection element and a second grounding terminal, wherein, in a longitudinal direction of the heater, a distance from a center portion of the heater to the first temperature detection element is a first distance, and a distance from the center portion of the heater to the second temperature detection element is a second distance that is greater than the first distance, and wherein, in a first area which is farther from the center portion of the heater than the second temperature detection element is from the center portion of the heater in the longitudinal direction of the heater, a distance between the first conductor and the second conductor in a transverse direction of the heater is a first inter-conductor distance and a distance between the third conductor and the fourth conductor in the transverse direction is a second inter-conductor distance that is greater than the first inter-conductor distance.

2. The heater according to claim 1, wherein, in a second area which is farther from the center portion of the heater than the first area is from the center portion of the heater in the longitudinal direction of the heater, a distance between the first conductor and the second conductor in the transverse direction of the heater is a third inter-conductor distance and a distance between the third conductor and the fourth conductor in the transverse direction of the heater is the third inter-conductor distance.

3. The heater according to claim 2, wherein, in the second area, the first conductor is connected to the first power supply terminal, the second conductor is connected to the first grounding terminal, the third conductor is connected to the second power supply terminal, and the fourth conductor is connected to the second grounding terminal.

4. The heater according to claim 2, wherein the second area is covered with a first protective member.

5. The heater according to claim 4, wherein the first area is covered with a second protective member that is different from the first protective member, and wherein sealing performance of the second protective member is lower than that of the first protective member.

6. The heater according to claim 4, wherein a third area closer to the center portion than the first area is covered with a second protective member that is different from the first protective member, wherein the first area and the third area are covered with a third protective member that is different from the second protective member, and wherein sealing performance of the third protective member is lower than those of the first protective member and the second protective member.

7. The heater according to claim 1, further comprising:

a third temperature detection element arranged on the second surface;

a fourth temperature detection element arranged on the second surface;

a fifth conductor arranged on the second surface and connecting the third temperature detection element and a third power supply terminal; and a sixth conductor arranged on the second surface and connecting the fourth temperature detection element and a fourth power supply terminal, wherein the first conductor connects the third temperature detection element and a third grounding terminal, wherein the third conductor connects the fourth temperature detection element and a fourth grounding terminal, wherein, in the longitudinal direction of the heater, a distance from the center portion of the heater to the third temperature detection element is a third distance, and a distance from the center portion of the heater to the fourth temperature detection element is a fourth distance that is longer than the third distance, and wherein, in a fourth area which is farther from the center portion of the heater than the fourth temperature detection element is from the center portion of the heater in the longitudinal direction of the heater, a distance between the first conductor and the fifth conductor in the transverse direction of the heater is a fourth inter-conductor distance and a distance between the third conductor and the sixth conductor in the transverse direction of the heater is a fifth inter-conductor distance that is longer than the fourth inter-conductor distance.

8. The heater according to claim 7, wherein, in a fifth area which is farther from the center portion of the heater than the fourth area is from the center portion of the heater in the longitudinal direction of the heater, a distance between the first conductor and the fifth conductor in the transverse direction of the heater is a sixth inter-conductor distance and a distance between the third conductor and the sixth conductor in the transverse direction of the heater is the sixth inter-conductor distance.

9. The heater according to claim 8, wherein, in the fifth area, the fifth conductor is connected to the third power supply terminal, the first conductor is connected to the third grounding terminal, the sixth conductor is connected to the fourth power supply terminal, and the third conductor is connected to the fourth grounding terminal.

10. The heater according to claim 8, wherein the fifth area is covered with a first protective member.

11. The heater according to claim 10, wherein the fourth area is covered with a second protective member that is different from the first protective member, and wherein sealing performance of the second protective member is lower than that of the first protective member.

12. The heater according to claim 10, wherein a sixth area on a side, of the fourth area, closer to the center portion is covered with a second protective member that is different from the first protective member, wherein the fourth area and the sixth area are covered with a third protective member that is different from the second protective member, and wherein sealing performance of the third protective member is lower than sealing performances of the first protective member and the second protective member.

13. The heater according to claim 1, further comprising:

a plurality of heating elements aligned in the longitudinal direction on the first surface;

a first heating block including a part of heating elements of the plurality of heating elements; and a second heating block including a heating element on an end portion side of the part of the heating elements included in the first heating block in the longitudinal direction.

14. The heater according to claim 13, wherein, as viewed in a thickness direction of the heater, the first temperature detection element overlaps with the first heating block, and the second temperature detection element overlaps with the second heating block.

15. A fixing apparatus comprising:

a cylindrical film to be heated by the heater according to claim 1; and a pressure roller forming a nip portion with the film, wherein the heater is arranged in an internal space of the film, the film is sandwiched between the heater and the pressure roller, and an image formed on a recording material is heated at the nip portion via the film.

16. An image forming apparatus comprising:

an image forming unit configured to form an image on a recording material; and the fixing apparatus according to claim 15 configured to fix the image formed on the recording material.

* * * * *